United States Patent [19]

McMurtry et al.

[11] Patent Number: 4,932,131
[45] Date of Patent: Jun. 12, 1990

[54] POSITION DETERMINATION APPARATUS

[75] Inventors: David R. McMurtry, Wotton-Under-Edge; David Wilson, Stonehouse; Gillies D. Pitt, Hewelsfield, all of United Kingdom

[73] Assignee: Renishaw plc, Gloucestershire, United Kingdom

[21] Appl. No.: 264,970

[22] PCT Filed: Mar. 7, 1988

[86] PCT No: PCT/GB88/165
§ 371 Date: Oct. 24, 1988
§ 102(e) Date: Oct. 24, 1988

[87] PCT Pub. No: WO88/06713
PCT Pub. Date: Sept. 7, 1988

[30] Foreign Application Priority Data

Mar. 6, 1987 [GB] United Kingdom ............... 8705303
Mar. 6, 1987 [GB] United Kingdom ............... 8705304

[51] Int. Cl.⁵ .................................................. G01B 5/02
[52] U.S. Cl. ......................................... 33/1 M; 33/503
[58] Field of Search ............... 33/502, 503, 504, 505, 33/1 M, DIG. 4, DIG. 21, 708, 702; 364/571.01, 571.05, 571.06; 73/1 J

[56] References Cited

U.S. PATENT DOCUMENTS 3,555,254 1/1971 Gerber .
3,654,446 4/1972 Gordon et al. .
3,661,463 5/1972 Brainard et al. .
4,195,412 4/1980 Llop ........................ 33/DIG. 21 X
4,261,107 4/1981 Coleman et al. .
4,457,625 7/1984 Greenleaf et al. .
4,663,852 5/1987 Guarini ................................. 33/1 M

FOREIGN PATENT DOCUMENTS 0048851 4/1982 European Pat. Off. .
3542514 6/1987 Fed. Rep. of Germany .
0065103 4/1986 Japan ..................................... 33/708
2162942 2/1986 United Kingdom .
00327 1/1988 World Int. Prop. O. .

OTHER PUBLICATIONS

"Random Path Measurement for Robotics with a Tracking Interferometer", Lawrence B. Brown, Proceedings of Laser Gauging and Inspection Conf. Mar. 18-20, 1986.

Primary Examiner—Harry N. Haroian
Attorney, Agent, or Firm—Spencer & Frank

[57] ABSTRACT

A position determination apparatus comprising a coordinate measuring machine having a scale. In addition, a read/write head and a laser interferometer system are provided, both of which can measure the position of a probe. The head writes signals derived from the interferometer onto the scale and is used either to lay down the periodic scale marks, or to write error correction values onto the scale. The scale is thus calibrated in situ on the machine.

8 Claims, 2 Drawing Sheets

POSITION DETERMINATION APPARATUS

BACKGROUND OF THE INVENTION

This invention relates to position determination apparatus, and to methods of calibrating such apparatus.

Co-ordinate measuring machines (CMM's) and machine tools are two examples of apparatus in which a determination is made of the relative positions of a fixed structure and a movable structure. This may be done either to determine the position of a workpiece-sensing probe provided on one of the structures, or (in the case of a machine tool) to position a cutting tool for a cutting operation. It is known to provide a scale on one of the structures, which has a series of marks. The other structure is provided with a read head for reading the marks on the scale. Normally there are two or three or even more such scale/read head combinations, arranged orthogonally in order to give co-ordinate readings. Various technologies are known for the scale and read head. For example, the scale may comprise optical marks, with an opto-electronic read head. Alternatively, the scale may have magnetic marks, with a magnetic read head.

The accuracy of the apparatus obviously depends on the accuracy of the scale, and careful attention is usually paid to ensuring that the scale is accurately manufactured and calibrated prior to installing it on the machine tool or CMM. However, it is found that inaccuracies can still arise. For example, the scale may become distorted during installation onto machine, or it may be misaligned (e.g. not parallel to the direction of relative motion or not accurately orthogonal to the other scales). Furthermore, inaccuracies or other problems may arise due to misalignment of the read head relative to the scale. Even if accurately installed, inaccuracies can arise during use, for example because of thermal distortion of the scale or the structure to which it is mounted, or distortion due to non-rigidity of the structure under dynamic loads.

It is known (e.g. form U.S. Pat. Nos. 3,555,254 and 3,654,446) to calibrate the machine after the scale has been installed, by using an interferometer to measure those errors noted above which are non-dynamic, at numerous points over the volume of the machine. The first of these patents suggests recording a table of such error value in a computer memory. When the machine is in use, the computer which is controlling the measurement operations can then access the relevent part of the table to obtain an appropriate error value for each scale reading which it takes. The errors in the scale reading can then be corrected automatically by the computer. Unfortunately, a disadvantage of this is the time taken to find and access the appropriate error value in the table, since such error correction needs to operate in real time as the read head is moving over the scale.

SUMMARY OF THE INVENTION

In broad outline, the present invention (at least in some aspects) consist in the provision of a scale for such a machine, on which scale marks or other information can be written, as well as merely read by the read head or other reading means.

One aspect of the present invention provides position determination apparatus comprising a relatively fixed structure, a relatively movable structure, a scale on one of the structures, and means on the other structure for reading the scale in order to determine the relative positions of the structures, characterised by calibration means (independent of the scale and reading means) for determining the relative position of the structures, and means on said other structure for writing a signal onto the scale in accordance with an output of the calibration means.

A second aspect of the invention provides a method of calibrating position determintion apparatus, the apparatus comprising a relatively fixed structure, a relatively movable structure, a scale on one of the structures, and means on the other structure for reading the scale in order to determine the relative positions of the structures, the method comprising:

providing calibration means (independent of the scale and reading means) for deternining the relative positions of the structures;

moving the movable structure into a plurality of different positions relative to the fixed structure; and, at each of said different positions, using the calibration means to determine the relative position and writing a signal onto the scale in dependence on the relative position thus determined, using writing means on said other structure.

The signals written to the scale may comprise a series of marks, which may be spaced periodically and can be read by the reading means in order to determine the relative positions of the structures. This may be performed during manufacture of the apparatus, or even after installation of the apparatus on the end user's premises, after which the calibration means and perhaps the writing means may be removed. This procedure ensures that inaccuracies cannot be introduced into the scale during its installation onto the machine, since the scale marks are writen in situ and not prior to installation. Misalignmemts between the reading means and the scale are also less important since the writing means will likely be aligned similarly to the reading means. Indeed, the latter problem may be eliminmated if the reading means itself is capable of writing to the scale and is used as the writing means.

If desired, the machine can be recalibrated at intervals, say once a year, using removable calibration means to re-write the signal onto the scale. Alternatively, the apparatus may be supplied to the end user complete with the calibration means and the writing means. In this case, the end user may simply re-calibrate the scale by re-writing the periodic marks onto it at different times during a working day. This can take account of inaccuracies due to thermal distortion of the scale or of the structure on which it is mounted.

Alternatively, the signals written to the scale may be encorded error correction values. The error correction values may be written onto the scale at the relevent position by said writing means on said other structure. However, in broad outline, a third aspect of the invention relates to the provision of such error correction values on the scale itself, irrespective of how they are recorded. The following description contains novel features relating to the provision of error correction values on the scale, which can be recorded in other ways than by said writing means.

BRIEF DESCRIPTION OF THE DRAWINGS

Preferred embodiments of the invention will now be described by way of example, with reference to the accompanying drawings, wherein.

DESCRIPTION OF THE PREFERRED EMBODIMENTS

Figure 1:
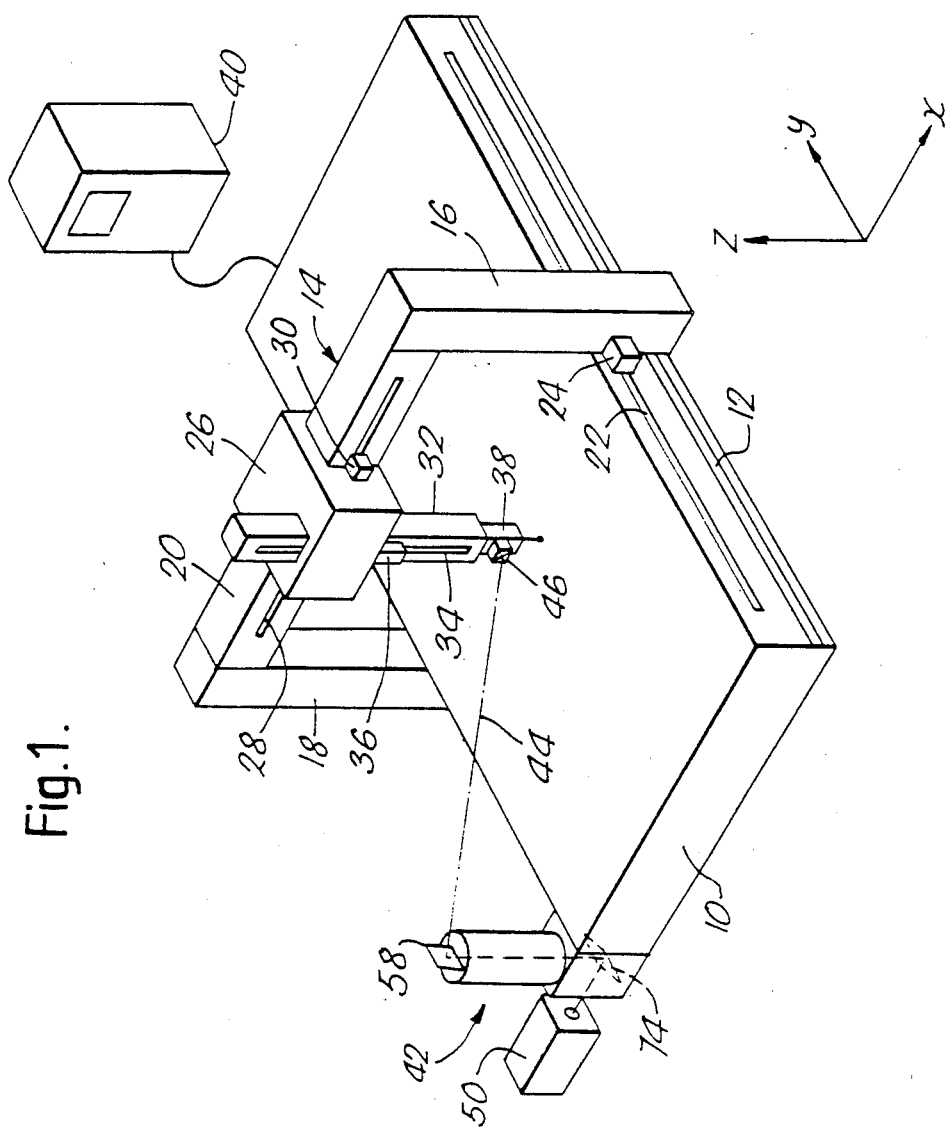
FIG. 1 is an isometric view of a co-ordinate measuring machine (CMM)

Referring to FIG. 1, the CMM has a fixed structure comprising a table 10 to which a workpiece to be inspected may be fixed. With respect to this table, two orthogonal horizontal axes may be designated x and y, while a vertical axis may be designated z. On each side of the table 10, there is a slideway running in the y direction (only one being visible in FIG. 1). A movable structure 14 comprises two vertical pillars 16, 18 and a cross beam 20. The pillars 16, 18 slide in the y direction along the slideways 12. A scale 22 is provided on the table 10 and also extends inn the y direction, and the pillar 16 has a head which reads periodic marks on the scale. The head 24 is both a read head and write head, capable of writing marks onto the scale 24. However, separate read and write heads may be employed if desired. Alternatively, a read head and a write head each in the form of an interchangeable cartridge may be provided, being swapped over as required.

In the present embodiment the scale 22 and the read/write head 24 are magnetic. The scale 22 may be a rod or bar of magnetic material. Alternatively, it may comprise a suitable substrate covered by a layer of magnetic material or by as magnetic tape. Whilst preferably the scale should have a low coefficient of thermal expansion, and should be sufficiently rigid not to distort under the normal loadings experienced during use of the machine, this is not as critical as in the proir art, as brought out below. Accordingly, the manufacture of the scale can be cheaper than hitherto. Similarly, correct alignment of the scale on the machine in not as critical as previously.

The read/write head 24 may have various types of magnetic transducer for reading and writing the marks onto the scale. For example, they may be inductive coils, fluxgates, or (in the case of the read head) a magnetoresistive sensor. Hall effect devices, magnetodiodes and fiber optic magnetic sensors are also possible. The same transducer may be used for both reading and writing, if an appropriate type of transducer is chosen.

A carriage 26 is slideable in the x direction along the cross beam 20 in slideways (not shown). The cross beam 20 has a scale 28 and the carriage has a read/write head 30 which reads the marks on the scale 28. A spindle 32 is slideable vertically (in the z direction) in the carriage 26. The spindle 32 carries a scale for the z direction, and the carriage 26 has a read/write head 36 which reads this scale. The scales 28, 34 and the read/write heads 30, 36 are similar to the scale 22 and read/write head 24.

At its lower end, the spindle 32 carries a probe 38, which may for example be of the touch trigger type which gives a signal the instant the probe contacts the surface of a workpiece, causing a computer 40 to take x, y and z co-ordinate readings from the read/write heads 24, 30 36. Such operation in well known.

It will be seen that the table 10 is a fixed structure and that the structure 14 is movable relative to it. Furthermore, the carriage 26 is a movable structure, with respect to which the structure 14 is relatively fixed. The spindle 32 and probe 38 also form a structure with respect to which the carriage 26 is relatively fixed. However, as is quite common, it is perfectly possible for the probe 38 to be mounted on a fixed structure, with the table 10 being movable structure mounted via carriages and slideways for movement in x, y and z directions. Appropriately mounted scales and read heads on the various parts of such structure then indicated the co-ordinates of the probe relative to the table.

To one side of the table 10 is mounted a laser interferometer system 42. This shines a laser beam 44 onto a retroreflector 46 mounted on the probe 38. The retroreflector 46 should be of any known design which reflects the laser beam 44 back to the interferometer system 42, such as a corner cube retroreflector, a cone retroreflector or a cats eye retroreflector.

The laser interferometer system 42 can track the movement of the retroreflector 46 on the probe 38, as described below, and to this end it has a mirror 58 mounted for pivoting about both vertical axis and a horizontal axis under servo control.

Figure 2:
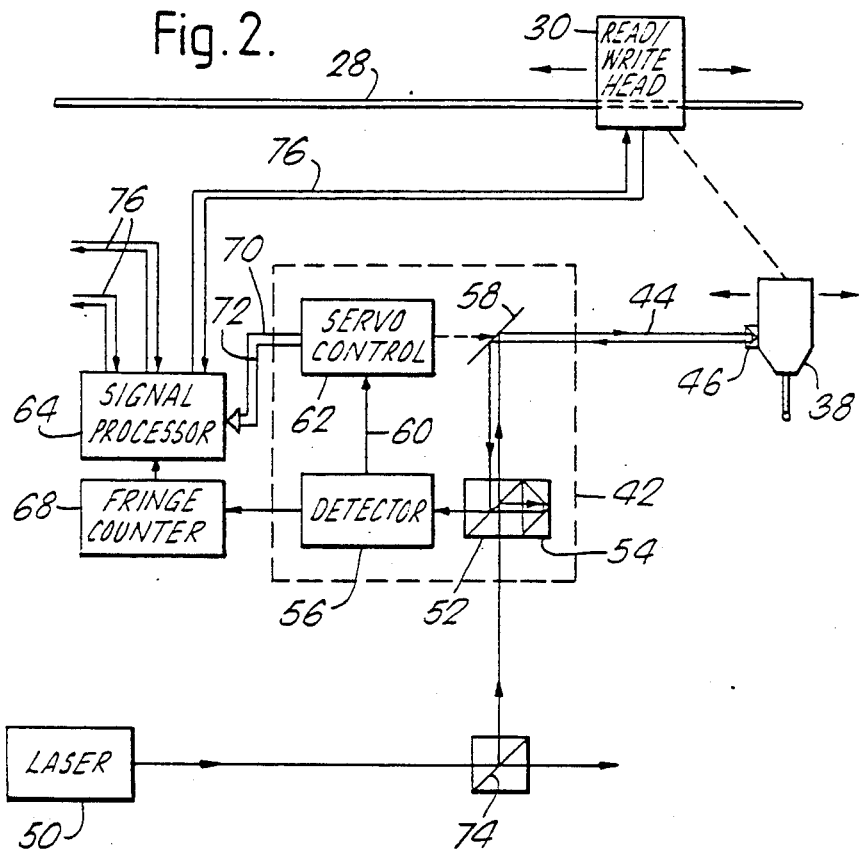
FIG. 2 is a diagrammatic illustration of parts of the machine.

Referring to FIG. 2, the interferometer system 42 receives a coherent beam of light from a laser light source 50, mounted separately from the table 10 to reduce vibration. The beam of light is directed to a beam splitter 52 in the interferometer 42. Part of the beam is passed from the beam splitter 52 to a retroreflector 54, back to the beam splitter 52 and then to a photodetector 56. This forms a reference arm of the interferometer. Another part of the laser beam passes straight through the beam splitter 52 to the tracking mirror 58. The mirror 58 deflects the laser beam so that it impinges upon and is reflected by the retroreflector 46 on the probe. The beam then returns by the same path, and is directed by the beam splitter 52 to the detector 56, where it produces interference fringes with the reference arm of the beam. These fringes are counted by a fringe counter 68 which also detects the direction of their movement, so as continually to keep an updated count of the distance r of the probe 38 from the interferometer 42.

The detector 56 includes a conventional quadrature detector having four quadrants, in order to be able to detect any delection of the axis of the reflected laser beam. An output 60 of the detector is fed to a servo control 62, which controls the pivoting movement of the tracking mirror 58 about both its horizontal and its vertical pivot axes. This therefore forms a feedback circuit so that the mirror 58 continually tracks the motion of the retroreflector 54 and hence the probe 38. Three or four separate photodiodes may be used in place of the quadrature detector 56.

A signal processing circuit 64, which may be microprocessor-based, receives the output of the fringe counter 68, representing the distance r between the interferometer and the probe 38. It also receives signals on lines 70, 72 from the servo control 62 (or from angular resolvers attached to the pivots of the mirror 58). The signals on lines 70, 72 represent angles $\theta$ and $\phi$ through which the mirror 58 has pivoted about the horizontal and vertical axes. These values r, $\theta$ and $\phi$ uniquely identify the precise point in space of the retroreflector 46 and hence of the probe 38. The signal processor 64 includes processing capacity to convert these r, $\theta$ and $\phi$ values into corresponding x, y, z co-ordinates. If desired, the signal processor 64 could be replaced by an appropriate sub-routine in the computer 40.

Instead of measuring the pivot angles $\theta$ and $\phi$ of the mirror 58, one could use three or more laser interferometers 42 located at different positions on the edge of the table 10. Each interferometer has its own servo controlled mirror 58 to track the retroreflector 46. Furthermore, each has its own detector 56 and fringe counter 68 so as to determine distance. From the three separate distance readings thus obtained, the x, y and z co-ordinates of the retroreflector are calculated by the signal processor 64 (or by the computer 40) by triangulation in a known manner. This may be done on the basis of the known separations of the interferometers, or these separations may be calculated from measurements made of a known, standard object. There may be three separate laser 50, but rather than this, preferably there is merely one laser 50 which has its beam split by further beam splitters and distributed to each of the three interferometers 42. Such as beam splitter is shown at 74 in FIGS. 1 and 2. Examples of triangulation-type tracking interferometers are shown in U.S. Pat. No. 4,457,625, and in a paper entitled "Random Path Measurement for Robotics with a Tracking Interferometer" by Lawrence B. Brown, Proceedings of the Laser Gauging and Inspection Conference, held in Dearborn, Detroit, Michigan, U.S.A. on March 18th-20th, 1986.

A further alternative, rather than using a tracking interferometer, is to use an interferometer system which provides x, y and z co-ordinate information more directly by using interferometers and laser beam which follow the structure of the machine, namely the piller 18, cross beam 20, carriage 26 and spindle 32. Such systems are described in U.S. Pat. Nos. 3,661,463 and 4,261,107 and in our International Patent Publication No. WO 88/00327.

In a simple method according to the invention, the laser interferometer 42 and retroreflector 46 are used only during manufacture and are removed prior to shipping of the system. In this case, they are used to write the periodic marks onto the x, y and z scales 22, 28, 34, after the scales have been fixed in place on the machine. This is done using the combined read/write heads 24, 30, 36 via lines 76 (only the x scale 28 and head 30 being shown in FIG. 2). To write the marks onto the x scale 28, the carriage 26 is traversed so that the read/write head 30 passes the length of the scale 28, while at the same time the laser interferometer tracks the retroreflector 46 and the signal processing circuit 64 continually calculates an up-to-date and accurate value of the x co-ordinate. Simultaneously, the write head 30 writes the periodic marks onto the scale 28 under the control of the signal processing circuit 64. There is thus obtained an accurately calibrated scale not subject to errors which might occur due to deformation or misalignment of the scale while mounting it on the machine. Furthermore, since the scale marks have been written by the head 30 itself, there are no problems caused by misalignment of the scale and read head. The y and z scales 22, 34 are written in a similar fashion. Provision may be made for removably re-mounting the laser interferometer and retroreflector, to permit subsequent recalibration of the machine, say at annual service intervals. Where this is intended, the read/write heads may be implemented as removable cartridges, containing a write head for calibration during manufacture or servicing, or a read head for use by the end user.

In another version of the invention, however, the interferometer 42 and retroreflector 46 form a part of the system sold to the end user. The user can then rewrite the scale marks at periodic intervals, thus overcoming any inaccuracies caused by such variable factors as thermal drift by ensuring that the scale markings are as up-to-date as possible.

In a further version of the invention, the read/write heads 24, 30, 36 are used to record encoded error correction values on the scale, as well as or instead of the periodic scale marks. This may be done during use of the system to measure a workpiece, and/or in a set-up procedure prior to such use and/or during manufacture of the scale. The error information recorded concerns the differences $\Delta x$, $\Delta y$, $\Delta z$ between the x, y, and z information as pre-recorded on the scale and the co-ordinates as calculated by the laser interferometer measurements. Thus, as the probe 38 is moved about the volume of the machine, the scale 28 is provided with continually updated error information, which is recorded on the scale in association with the corresponding periodic marking. When the probe 38 is triggered to take a reading, the computer 40 does so not merely on the basis of the usual periodic scale information, but also reads the corresponding error and takes that into account.

One advantage of recording such error information on the scales 22, 28, 34 during normal use of the machine is that normal operation of the machine will ensure that the error information is as up-to-date as possible. The information can thus take account of errors which change over a period of time, such as thermal drift. It can also take account of errors occuring due to operational loading and consequent deformation of various components of the machine. Furthermore, it can take account of such errors dynamically, while the probe is moving. Thus, if there is any small difference between the errors occuring when the structure is static and error is when it is moving, these are recording and taken into account. This can be of importance when measuring a workpiece with a touch trigger probe 38, since the practice hitherto has been to touch a workpiece with the probe at least twice, once at full speed to determine the approximate location of the surface (when the reading will be subject to dynamic errors) and once again at a very slow speed as to minimise dynamic errors. If the dynamic errors are recorded on the scale, this separate slow speed touching operation can be eliminated. Furthermore, if there is backlash in the mechanics of the system, a different error value can be recorded for each direction of movement.

It is particularly advantageous that the error information is recorded on the scale in association with the corresponding periodic marking, since it is then immediately available and time is not lost accessing it from a computer store. Continuous real time readout of corrected scale readings is therefore possible.

The reason for including the scales 22, 28, 34 and the corresponding read heads 24, 30, 36 rather than simply relying on the tracking interferometer 42 to provide co-ordinate measurements is as follows. As the probe 38 is moved around a workpiece to be measured, there will be times when the path of the laser beam 44 is broken. While the path is broken, obviously measurements cannot be made with the interferometer 42, and so reliance must be placed on the scale readings (with the most recently up-dated error information). Furthermore, after such a break in the path of the laser beam 44, the fringe counter 68 will have lost count of the number of fringes so that the interferometer can no longer be used to give readings. In these circumstances, therefore, the interferometer 42 needs to be re-set by a processs of datuming the probe 38.

When continuous updating of the scale marks or error information recorded on the scale is not important, provision may be made for removably re-mounting the laser interferometer and retroreflector, to permit subsequent recalibration of the machine, say at annual service intervals. Where this is intended, the read/write heads may be implemented as removable cartridges, containing a write head for calibration during manufacture or servicing, or a read head for use by the end user. Since a removable interferometer can be used on a number of machines, a considerable cost saving is achieved.

Figure 3:
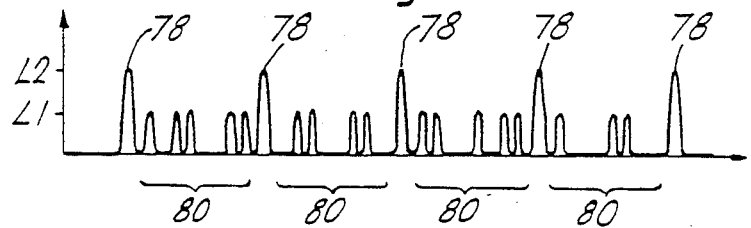
FIG. 3 is a graph showing the amplitude of a signal recorded on a scale of the machine.
Figure 4:
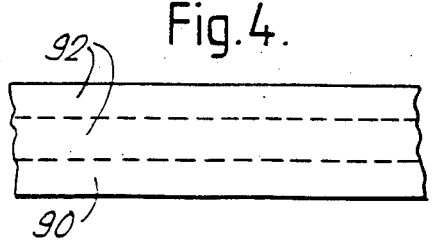
FIG. 4 shows an alternative scale.

The error information can be encoded onto the scales 22, 28, 34 in various ways. One possibility is shown in FIG. 4, where each scale includes two or more parallel tracks. The first track 90 has the normal periodic marks, recorded as a sinusoidal signal. There may be two tracks having such sinusoidal signals, in quadrature. The remaining track or tracks 92 contain a recorded signal with the error information corresponding to an adjacent mark on the first track. The error information may for example be in the form of a binary coded signal encoded onto one track or onto several parallel tracks. Obviously, this requires the complication that the read/write heads 24, 30, 36 must have separate transducers for the separate tracks. As an alternative, therefore the signal may be recorded on a single track, in any of the ways suggested in our co-pending UK Patent Application No. 8704204 and corresponding International Application No. PCT/GB 88/00119. In one such way, as shown in FIG. 3, recorded onto the single track of the scale is a signal comprising pulses of two different amplitudes L1 and L2. The pulses 78 of the higher amplitude L2 constitute the regular periodic marks. Adjacent to each of these marks 78 is an associated group of pulses at the lower amplitude L1, forming a binary word 80. In a simple form, each binary word 80 may simply contain the error information for the associated mark 78, e.g. $\Delta x$ in the case of the x scale 28.

However, it is possible to record rather more sophisticated error information, as follows. Because of deformations of various parts of the structure in operation of the machine, it is desirable to be able to take account of errors caused by roll, pitch and yaw of the probe 38, which errors will differ over the entire volume of the machine. Thus, for example, the error $\Delta x$ for given value of x will vary depending on the current vlaues of y and z. Thus, it would be possible if desired for the signal processor 64 to produce in respect of each mark 78 on the x scale 28 not merely one value of $\Delta x$, but a table of such values $\Delta x$ for each value of y and z within the corresponding x plane. Similarly, for each of the marks 78 on the y scale it would be possible to produce a table of values of $\Delta y$, and for each of the marks 78 on the z scale it would be possible to produce a table of values $\Delta z$.

However, since it would be difficult to record all these tables of values corresponding to each mark 78, we prefer to condence the information, for example in the following way. Successive binary words 80 corresponding to successive marks 78 along the x scale record the error $\Delta x$ at respective different values of y and z. Thus, for example, if a first mark 78 at a position $x_0$ has a corresponding binary word recording error information $\Delta x(y_0, z_0)$, relating to the error in the x value at position $x_0, y_0, z_0$, then the next binary word 80 along the x scale at a position $x_1$ may record the error $\Delta x(y_0, z_1)$ at the position $x_1$, the next may record the error $\Delta x(y_0, z_2)$ and so forth. After running through a series of $\Delta x$ error values for different values of z in this way, the process would be repeated for a set of values of z at a position $y_1$ (e.g. $\Delta x(y_1, z_0)$, $\Delta x(y_1, z_1)$, etc.) and then another set at $y_2$, and so on. Finally, after working through all the y and z values, the next binary word 80 along the x scale would record another value of $\Delta x(y_0, z_0)$ for the current x position. Errors $\Delta y$ and are recorded on the y and z scales in a similar manner. Thus, the computer is given a map of errors over the entire volume of the machine and can obtain intermediate values by interpolation.

The embodiments of the invention described above have utilised magnetic read/write heads and magnetic scales which can be written to and read by generally conventional means. However, other technologies for these scales and read/write heads are possible. For example, the scales may be optical scales, having a layer of a material which is writeable optically, e.g. by photolithographic techniques. The material may have marks written on it by a light emitting diode, or for greater precision by a laser (e.g. a solid state laser) or an optical fibre scale. Photo sensors for reading an optical scale are readily available. Alternatively, scales utilising a magneto-optical material may be used, which is writeable by an optical signal which causes a change of magnetic phase in the material.

The above description has been in relation to CMM's. However, the same apparatus and methods may also be used or numerically controlled machine tools.

We claim:

1. Position determination apparatus comprising as relatively fixed structure, a relatively movable structure, a scale on one of the structures, and means on the other structure for reading the scale in order to determine the relative positions of the structures, wherein the improvement comprises calibration means, independent of the scale and reading means, for determining the relative positions of the structures; and means on said other structure for writing a signal onto the scale in accordance with an output of the calibration means.

2. Apparatus according to claim 1, wherein the writing means is arranged to write periodically spaced scale marks onto the scale.

3. Apparatus according to claim 1, wherein the writing means is arranged to write error correction values onto the scale.

4. Apparatus according to claim 1, wherein a combined read-write head provides both the reading means and the writing means.

5. A method of calibrating position determination apparatus, the apparatus comprising a relatively fixed structure, a relatively movable structure, a scale on one of the structures, and means on the other structure for reading the scale in order to determine the relative position of the structures, the method comprising:
   providing calibration means, independent of the scale and reading means, for determining the relative positions of the structures;
   moving the movable structure into a plurality of different positions relative to the fixed structure; and
   at each of said different positions, using the calibration means to determine the relative position and writing a signal onto the scale in dependence on the relative position thus determined, using writing means on said other structure.

6. A method according to claim 5, wherein the writing means is arranged to write periodically spaced scale marks onto the scale.

7. A method according to claim 5, wherein the writing means is arranged to write error correction values onto the scale.

8. A method according to claim 5, wherein a combined read/write head provides both the reading means and the writing means.

* * * * *